Fig. 1.

C. DE CAZEN.
CIGARETTE MAKING MACHINE.
APPLICATION FILED SEPT. 11, 1908.

1,042,652.

Patented Oct. 29, 1912.

Witnesses.
H. Davis
G. H. Tresidder

Inventor.
Canaan de Cazen
by
C. J. Fetherstonhaugh
Atty

C. DE CAZEN.
CIGARETTE MAKING MACHINE.
APPLICATION FILED SEPT. 11, 1908.

1,042,652.

Patented Oct. 29, 1912.

Witnesses.
N. Davis
G. H. Tresidder.

Inventor
Canaan de Cazen
by
C. J. Featherstonhaugh
Atty.

C. DE CAZEN.
CIGARETTE MAKING MACHINE.
APPLICATION FILED SEPT. 11, 1908.

1,042,652.

Patented Oct. 29, 1912.
6 SHEETS—SHEET 5.

Witnesses
A. Davis
G. H. Tresidder

Inventor
Canaan de Cazen
by
C. J. Fetherstonhaugh
Atty.

C. DE CAZEN.
CIGARETTE MAKING MACHINE.
APPLICATION FILED SEPT. 11, 1908.

1,042,652.

Patented Oct. 29, 1912.
6 SHEETS—SHEET 6.

UNITED STATES PATENT OFFICE.

CANAAN DE CAZEN, OF MONTREAL, QUEBEC, CANADA.

CIGARETTE-MAKING MACHINE.

1,042,652.

Specification of Letters Patent. Patented Oct. 29, 1912.

Application filed September 11, 1908. Serial No. 452,566.

*To all whom it may concern:*

Be it known that I, CANAAN DE CAZEN, a subject of the King of Great Britain, and resident of 102 St. Andre street, in the city and district of Montreal, in the Province of Quebec, in the Dominion of Canada, have invented certain new and useful Improvements in Cigarette-Making Machines; and I do hereby declare that the following is a full, clear, and exact description of the same.

The invention relates to improvements in cigarette making machines, as described in the present specification and illustrated in the accompanying drawings that form part of the same.

The invention consists essentially in the novel construction and arrangement of parts whereby the feed rolls gathering the tobacco from the hopper are formed and set, in relation one to the other, so as to definitely determine the proper quantity fed into the forming mechanism, and the latter so associated with the former and formed as to facilitate the shaping and passage of the length of paper-inclosed tobacco, and whereby the said length is cut by an adjustable and positive shearing mechanism moving to and from the delivery end, of the forming tube.

The objects of the invention are to simplify the construction of machines for cigarette making, to turn out the completed cigarette of any desired length with the aid of automatically operating contrivances and to facilitate the repairing and replacement of parts.

In the drawings.

Like numerals of reference indicate corresponding parts in each figure.

Referring to the drawings, 1 is the feed hopper resting on and secured to the frame 2, said frame having the lateral extensions 3 and the vertical extensions 4 closing in the sides of the feed receptacle formed by said hopper.

5 is a toothed plate supported in the slideways 6 and adapted to move in a reciprocatory manner in the said slideways. The toothed plate 5 is preferably arranged so as to close an opening in the front and inclined side of the feed hopper 1, though it may be arranged in any suitable manner as long as the teeth are so set as to keep the tobacco in the hopper moving in a downward direction.

7 is the main feed roll having suitable shaft extensions 8 therefrom, journaled in fixed bearings arranged in the sides formed by the vertical extensions 4 and toward the lower end of said extensions.

9 are picks projecting from the periphery of the roller 7 and inclined in the direction of rotation of said roll. The said picks 9 may be secured directly to the roll or extend from a covering 10 completely surrounding said roll.

11 is a regulating roll, having the shaft extensions 12, and adjustably journaled so as to govern the quantity of tobacco passing it and the aforesaid main feed roll.

13 are picks extending in a radial direction from the periphery of the regulating roll 11 or preferably from a covering surrounding said roll.

14 is a drag roll having the shaft extensions 15 therefrom and adjustably journaled to the inside of the regulating roll 11, in relation to said main roll 7, so as to finally determine the quantity of tobacco fed into the machine, and to prevent any choking in the feed mechanism by its peculiar mode of operation.

16 are picks secured to the drag roll 14 projecting from the periphery thereof and inclined in a rearward direction from the direction of rotation of said roll.

17 are flanged blocks forming bearings for the shaft extensions 12, of the regulating roll 11.

18 are flanged blocks forming bearings for the shaft extensions 15 of the drag roll 14.

The blocks 17 and 18 are inserted into corresponding and open slots at the top ends of the vertical extensions 4 and are secured to said vertical extensions in the desired position in said slots by the cap or set screws 19, consequently the aforesaid rolls 11 and 14 may be moved to and from the said main roll 7 by adjusting the blocks 17 and 18 respectively in said open slots.

20 is a roll journaled toward the lower end of the vertical extensions 4 in bearings in the flanged blocks 21, said blocks being secured by suitable screws to said vertical extensions, preferably adjustable, thus necessitating holes through said vertical extensions of larger dimensions than the shaft extensions 22. The roll 20 is placed to the inside of the main feed roll 7 and is covered with the radially extending bristles 23 adapted to sweep the tobacco from the main feed roll.

24 is a sprocket wheel fixedly mounted on a shaft extension 8 on the main feed roll 7.

25 is a sprocket wheel of smaller dimensions and fixedly mounted on a shaft extension 15 from the drag roll 14, consequently the main feed roll 7 and the drag roll 14 are operatively connected.

26 is a bevel gear fixedly mounted on a shaft extension 8 to the outside of the sprocket wheel 24.

27 is a shaft journaled in the bearings 28 projecting outwardly from one of the vertical extensions 4.

29 is a bevel pinion fixedly mounted on the shaft 27 and coacting with the bevel gear 26.

30 is a worm wheel fixedly mounted on the shaft 27 at the other end from the pinion 29.

31 is a shaft journaled in the bearings 32, projecting from the vertical extensions 4 and set at right angles to the bearings 28 of the shaft 27.

33 is a worm formed at one end of a shaft 31 and coacting with the worm wheel 30.

34 is a sprocket wheel fixedly mounted at the other end of the shaft 31.

35 is a sprocket wheel fixedly mounted on a shaft extension 12 from the regulating roll 11.

36 is a sprocket wheel fixedly mounted on a shaft extension 22 from the bristle roll 20.

37 is a sprocket wheel loosely mounted on the shaft extension 8, on the main feed roll 7, said sprocket wheel 37 having a pin 38 projecting outwardly from the outer side face thereof.

39 is a sprocket chain, extending around the sprocket wheel 34, over the sprocket wheel 36, around the sprocket wheel 37 and around the sprocket wheel 35, thus operatively connecting the sprocket wheel 34 with the regulating roll 11, bristle roll 20 and sprocket wheel 37, so that on the rotation of the shaft 31 all the rolls will be set in motion.

40 is a crank pivotally secured at the angle thereof to the rod 41, the latter being secured to and extending from the hopper 1.

42 is a connecting rod at one end pivotally secured to the extremity of a section of the crank 40 and at the other end to the pin 38.

43 is a link having the bent ends 44, one of said bent ends being pivotally secured to the extremity of the other section of the crank lever 40 and the other of said bent ends being pivotally connected to the pin 45 projecting from the outer side of the toothed plate shaker 5.

46 is a helical spring, at one end secured to the link 43 and at the other end to a pin 47 projecting from the hopper below the shaker 5.

It will be thus seen that on the rotation of the sprocket wheel 37 a reciprocal movement will be imparted to the toothed plate shaker 5, as at each revolution of the said wheel 37, the crank 40 will be turned on its pivot, thus drawing the link 43 in an upward direction, while the spring 46 will insure the return of said link to its lower position.

48 is a tapered pulley fixedly mounted on the shaft 31 between the bearings 32.

49 is a funnel secured to the lower end of the vertical extensions 4, immediately below the delivery side of the main feed roll 7, that is to say, the side where the tobacco is brushed from the said main feed roll by the bristle roll 20.

52 is a shield plate extending inwardly within the hopper over the regulating roll 11 and the drag roll 14.

53 is a shield extending downwardly from the shield plate 52 around the inner portions of the regulating roll 11, drag roll 14 and the bristle roll 20 and secured at the lower end to the vertical extensions 4.

54 is a table having the wheel slot 55 centrally arranged at one end thereof, paper slot 56 and the ribbon slots 57 intermediate of its length, said table being supported on the frame 58 and supporting the frame 2 at one end thereof over the wheel slot 55, the said frame 2 being rigidly secured to the said table.

59 are horizontal bearings rigidly secured to the frame 58 toward the lower end thereof at each end and intermediate of the length of said frame.

60 is the main driving shaft journaled in the bearings 59 having at one end thereof beyond said bearing the customary fixed and loose pulleys 61 and 62 respectively.

63 is a tapered pulley fixedly mounted on the shaft 60 beneath the pulley 48 and having its taper opposing the taper of said pulley 48.

64 is a crossed belt operatively connecting the pulleys 48 and 63.

65 is a rod having the threaded end 66 extending through the lug 67 projecting outwardly from the upper portion of the frame 58 above the pulley 63, the said rod 65 being adapted to move horizontally in said lugs.

68 is a nut turning on the threaded end 66 to the outside of the lug 67 and arranged to move said rod through said lugs.

69 is a fork rigidly secured on the rod 65 and engaging said belt 64 at the point of crossing, so that the said fork, rod and nut constitute a belt shifter for moving the said belt on the tapered pulleys 48 and 63 to vary the rate of speed of rotation of the rolls in the feed mechanism.

70 is a belt shifter operated by the lever 71 for shifting the belt from the loose to the fixed, or the fixed to loose pulleys on the main driving shaft.

72 is a carrier wheel fixedly mounted on a shaft 73, said shaft being journaled in the bearings 74.

75 and 76 are circumferential grooves in the rim of the wheel 72, said grooves being of different widths to accommodate different sizes of cigarettes.

The bearings 74 are secured to the upper portion of the frame 58, so that the wheel projects upwardly through the wheel slot 55 in the table, the funnel 49 extending into one or other of the grooves 75 or 76.

The wheel 72 is adjustably fixed to the shaft 73 so that the funnel may be placed in the proper groove and the groove in operation brought in alinement with the forming mechanism.

77 is a bevel gear fixedly mounted on the shaft 73.

78 is a horizontal shaft journaled in the bearings 79, the latter being fixedly secured to the frame 58 and extending under the table.

80 is a bevel pinion fixedly mounted at the end of the shaft 78 and coacting with the bevel gear 77.

81 is a bevel pinion fixedly mounted at the other end of the shaft 78.

82 is a shaft journaled in the bearing 83 set at right angles to the bearings 79 and in the upper portion of the frame 58.

84 is a bevel gear fixedly mounted on the shaft 82 and coacting with the bevel pinion 81.

85 is a spur gear wheel fixedly mounted at the end of the shaft 82 beyond the bearing and frame 58.

86 is a shaft journaled in the bearings 87 at the lower end of the frame 58 and beneath the shaft 82.

88 is a spur gear wheel mounted at one end of the shaft 86.

89 is a spur gear wheel loosely mounted on the swinging bearing 90, said bearing being formed with a stub shaft 91 and the arm 92 pivotally swung from the shaft 82, a pin 93 at the lower end of said arm extending into a suitable arc-shaped slot in the frame 58 and secured in any desired position by the nut 94. Thus the spur gear wheel 88 may be changed to one of larger or smaller dimensions as desired and the intermediate gear 89 swung to bring it into proper mesh.

95 is a bevel gear fixedly mounted at the other end of the shaft 86 and coacting with the bevel gear wheel 96 fixedly mounted on the end of the main driving shaft 60.

Figure 14:
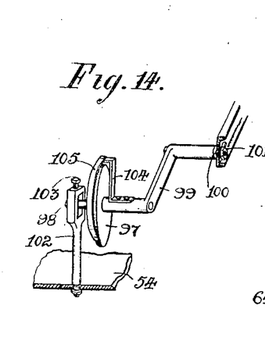
Fig. 14 is a detail of the pressure wheel and its support.

The pressure wheel 97 is loosely journaled on the shaft 98, said shaft being rigidly secured to the end of the arm 99. The arm 99 extends inwardly and has a right angular projection 100 therefrom threaded at the end and extending through a slot in the frame 2 for adjusting purposes.

101 is a nut placed on the threaded end of the projection 100 and securing said projection in the desired position in said slot.

102 is a bracket projecting upwardly from the table and slotted at its upper end, the other end of the shaft 98 extending through said slot.

103 is a threaded pin inserted through the top end of the bracket 102 into the slot in said bracket and adapted to screw down against said shaft and regulate the pressure of the wheel 97 on the tobacco in the groove of the carrier wheel 72.

104 is a bracket standing upwardly from the shaft 98 beside the wheel 97.

105 is a scraper rigidly secured to the bracket 104, extending partially around the wheel 97 and is for the purpose of preventing tobacco from sticking to said wheel.

106 is a longitudinal plate being the base of the forming mechanism rigidly secured to the table 54 in longitudinal alinement with the carrier wheel 72.

The base 106 is formed with a longitudinal and central groove 107, said groove being substantially semi-circular in shape toward the outer end of said base. The said groove 107 is formed toward the inner end with the over-hanging ledges 108, said ledges from the converging point 109 gradually disappearing until entirely lost at the inner end.

110 are strips having the downwardly depending flanges 111 at the inner sides thereof and rigidly secured to the base 106 to each side of the widened portion of the groove 107, the flanges 111 extending downwardly into said groove and forming recesses 112, into which the outer edges of the paper, passing through the tube, extend. The flanges 111 from the strips 110 also gradually disappear toward the inner end of the base 106.

It may be here explained that the base 106 is heavier at the center and gradually tapers off toward its inner end, thus producing in the groove 107 a gradual deepening thereof toward the said center of the base, and from the center outward, the base is of an even thickness at each side of the groove, the said grooves as before stated being substantially semi-circular at that end.

113 and 114 are the top pieces rigidly secured to the outer half of the base 106 and formed on the inner side to complete the tube for finishing the cigarette. The piece 113 at its inner end extends over to the far side of the groove 107 into proximity with the piece 114, leaving a longitudinal opening for a short distance through which one edge of the paper projects for pasting purposes.

The piece 114 has a projection 115 extending over the groove 107 to the piece 113, thereby turning over the paper which has been projecting on top of the other edge, on the paper surrounding the tobacco and sticking the said edges of the paper together, thus completing the long length of cigarette formation, which is guided through the end of the tube portion of the forming mechanism.

116 is a longitudinally concaved strip tapering toward its outer end and rigidly secured to the bracket 117. The bracket 117 is slotted at 118 and 119, the slots 118 being L-shaped and fitting onto the screws 120 projecting from the sides of the base 106, and the slots 119 being T-shaped and fitting onto the screws 121 projecting upwardly from the base 106 at each side of the central groove. The bracket 117 is thus adjustable and is held in the position desired by suitable nuts placed on the ends of the screws 120 and 121.

122 is a cross piece slotted and engaging the screws 123 projecting upwardly from the base 106, said cross piece being secured to said strip 116 and holding the end of said strip firmly over the groove 107 by means of suitable nuts on said screws abutting said cross piece. The strip 116 thus partially closes in the groove 107 at the entrance end leaving room for the edges of the paper to project upwardly but pressing tightly on the tobacco and forming the rope of tobacco in preparation for its covering of paper accomplished further on in the tube portion of the former.

124 is an endless ribbon extending along the groove 107 from end to end and over the roller 125, journaled in a bracket 126 and secured to the table 54 immediately in front of the entrance end of the groove 107, and over a roller 127, adjustably journaled in a bracket 128 secured to said table top beyond the delivery end of the groove 107. The ribbon 124 further extends over the guide roller 129 secured to the table 54, a roller 130 and the pulley 131, the pulley 131 being fixedly mounted on the shaft 82 and a roller 130 being loosely mounted on the shaft 132. The shaft 132 is adjustably held to the frame 58 and projects inwardly therefrom, the spring 133 extending downwardly from the table top and supporting the extreme end of said shaft 132, consequently the shaft 132 being adjustably fixed to the frame, the roller 130 may be moved in relation to the pulley 131 by the screw 134 extending through an orifice in the table top and inserted in a threaded orifice in the spring. Thus the ribbon may be always pinched tightly between the roller 130 and the pulley 131 to insure the travel of said ribbon along the groove 107.

135 is a roll of cigarette paper mounted and turning freely on a shaft 136. The paper from the roll extends through an opening in the casing 137, the latter being supported toward the lower part of the frame 58. A roller 138 is secured to the casing at the outer side thereof in immediate proximity to said opening to guide the paper centrally therethrough.

139 is a roller journaled within the casing 137 and around which the paper extends.

140 is a roller of larger dimensions journaled in proximity to the roller 139 and around which said paper extends. The roller 140 is journaled at the extreme end of the lower section of a crank lever 141, the said crank lever being pivoted in the casing at 142 and having a forked end to its upper section. The forked end of the upper section embraces the threaded rod 143 and a spiral spring 144 encircles said rod between said upper section and the inner wall of the casing.

The threaded rod 143 turns in a correspondingly threaded orifice in the side of the casing, a nut 145 being secured on its inner end and a lock nut 146 intermediate of its length abutting the outer wall of the casing. Thus the position of the roller 140 in relation to the type roller 147 may be adjusted by turning the said threaded rod 143.

148 is a size or ink well, into which extends a roll 149, said roll 149 being fixedly mounted on a shaft 150, the said shaft being journaled in the sides of the well 148.

151 is a cam fixedly mounted on the shaft 150. 152 is a ratchet wheel also fixedly mounted on said shaft.

153 is a lever with one end pivotally secured to the casing 137, extending above said well 148 and having a downwardly projecting finger 154 contacting the cam 151 and the bearing 155 at the outer end thereof for the gelatin roll 156.

157 is a spring exerting a constant downward pull on the lever 153 being secured at one end to the lever and at the other end to the side of the well.

158 is a lever pivoted adjacent to the pivot point of the lever 153.

159 is a pawl pivotally secured to the lever 158 and extending downwardly therefrom and engaging the ratchet 152.

160 is a spring secured to the casing and exerting a constant upward pressure during the downward pressure on the lever 158.

161 is a shaft journaled in the sides of the casing 137.

162 is a cam mounted on the shaft 161 and engaging the lever 158 at every revolution of the shaft 161.

163 is a roll fixedly mounted on the shaft 161 and contacting with the roll 156.

164 is a roll journaled in the casing 137 contacting with the roll 163 and the roll 165, the said roll 165 being journaled in the arm 166 and contacting with the type roll 147. The arm 166 is supported by the shaft of the roll 164 and extends to the casing wall to which it is adjustably held by the screw 167.

A spring 168 is secured at one end to the arm 166 and at the other end to the casing and holds the said arm against said screw.

The shaft 161 extends beyond the casing 137 and is journaled in the bracket 169 secured to the frame 58.

170 is a pinion slidably arranged on the shaft 161.

171 is a shaft journaled in the side of the casing 137 and in the bracket 169.

172 is a bevel gear wheel mounted at the other end of the shaft 171 and coacting with the bevel gear wheel 173 fixedly mounted on the main shaft.

174 is a pinion mounted on the shaft 171 and coacting with the pinion 170.

It will be thus seen that the printing rolls contained within the casing 137 and hereinbefore described are operated from the main shaft.

The shaft 161 is rotated by the meshing of the pinions 170 and 174 and this in turn drives the gear wheel 175 within the casing 137 mounted on the shaft 161. The gear wheel 175 coacts with the gear wheel 176 thus rotating the type roller 147. The remaining rolls in the group described are driven by friction and the roll 156 receives the size or ink after a predetermined number of revolutions of the shaft 161. This is accomplished through the contact of the cam 162 with the lever 158. The contact of said cam 162 with said lever turns the ratchet 152 by means of the pawl 159 and when the said ratchet has completed a part of a revolution, the cam 151 will permit the lever 153 to drop thereby bringing the roll 156 into contact with the roll 149 and as the said roll 149 is turning within the well 148, the roll 156 will be thoroughly sized or inked. The further rotation of the ratchet 152 lifts the lever 153 and brings the roll 156 into contact with the roll 163. The roll 163 inks or sizes the roll 164 which in turn inks or sizes the roll 165 and the roll 165 inks or sizes the type roll. Thus the paper in passing around the roller 140 is sized or inked by the type from the type roller 147.

177 is a roll having the arc-shaped face 178 and around which the paper 135 extends.

179 is a rubber covered roll turning in the bronze well 180 and contacting with the paper as the face 178 meets said roller and said roll 179 at each revolution of the roll 177.

181 is a rotary brush sweeping the bronze not adhering to the size from the paper back into the well 180.

182 is a roll backing the brush 181. The rolls 177, 179 and 182 and the brush 181 are suitably journaled in the sides of the casing 137.

183 is a gear wheel mounted on the shaft of the roll 177.

184 is a gear wheel mounted on a shaft suitably journaled in the sides of the casing 137, the said gear wheel 184 meshing with the gear wheel 183 and with the pinion 185 on the brush shaft.

186 is an intermediate gear wheel operatively connecting the gear wheel 175 on the shaft 161 with the gear wheel 183 thus connecting the typing and the bronzing mechanisms.

187 is a roller journaled in the sides of the casing 137 and over which the paper extends from the bronzing group of rolls.

188 is a roller around which the paper extends guiding said paper through the opening 189 in the top of the casing 137. The roller 188 is journaled at the end of the section of the crank lever 190 arranged in precisely the same manner as the crank lever 141 at the opposite end of the casing from said crank lever 141.

191 is a supplementary group of rolls for adding colors or other printing to the printing and bronzing already received in the groups described. The arrangement of the said group 191 is exactly the same as the typing group of rolls already described, having its type roll 192 engaging the paper over the periphery of the roller 188. The group 191 are connected by suitable gearing with the bronzing group or operated in any suitable manner.

It must be understood that the particular course of the paper through the casing 137, hereinbefore described, need not necessarily be adhered to as any group or portion of a group of rolls may be put out of commission for a different style of marking on the cigarette paper as desired.

193 is a roller suitably journaled and supported on top of the table 54 and over which the paper extends, said paper further extending over the roller 125 onto the ribbon 124, being carried along in the groove 107 on the ribbon 124.

It has already been mentioned that the tobacco is contained in the paper in the groove 107 and that the edge of the paper reaches into the recesses 112, but it has not been stated that the travel of the paper is insured by the continuous travel of the endless ribbon, that is to say, the ribbon carries the paper along with it in the groove 107.

194 is a bridge piece from the groove in the carrier wheel 72 to the groove in the carrier wheel and into the groove 107.

Figure 1:
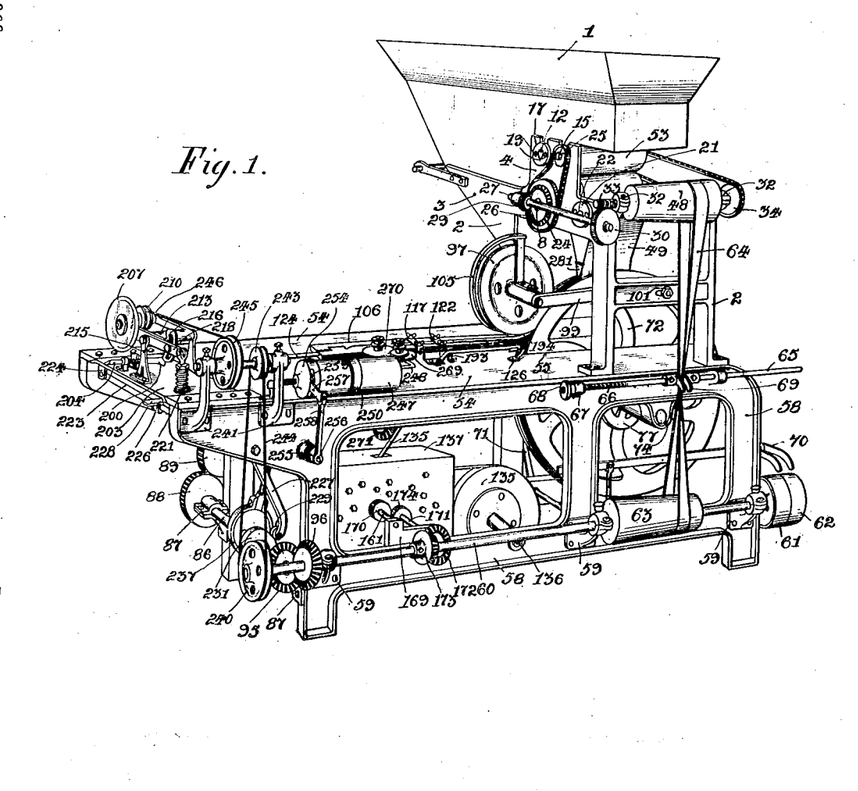
Figure 1 is a perspective side view of the machine complete.
Figure 2:
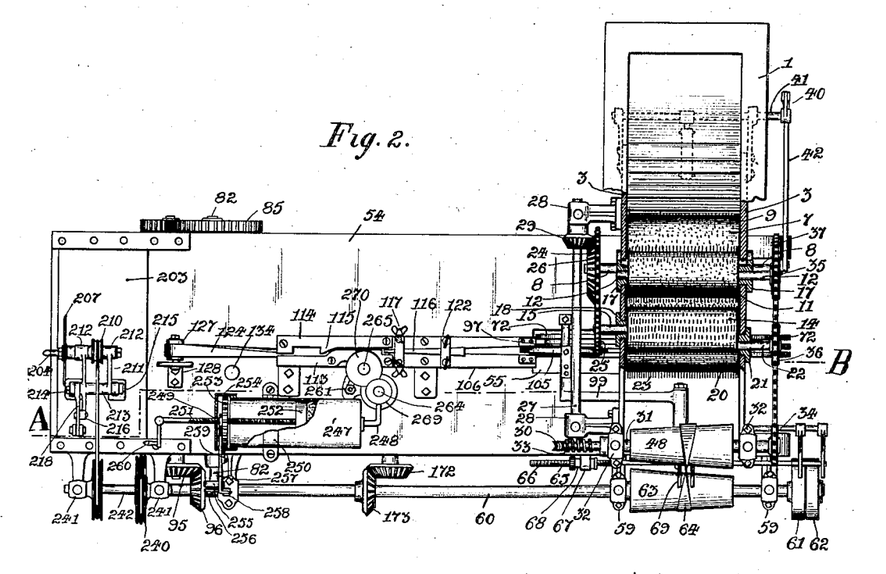
Fig. 2 is a plan view of the machine partially in section.
Figure 3:
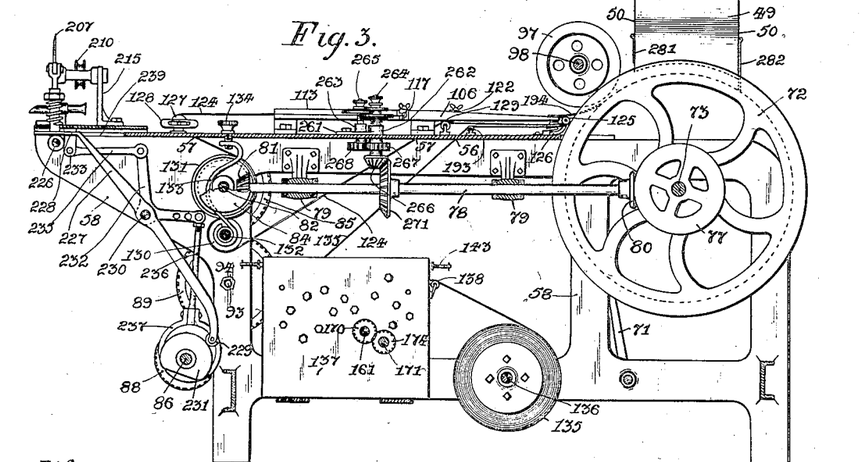
Fig. 3 is a longitudinal sectional view of the machine through the line A—B in Fig. 2, omitting part of the feed mechanism.
Figures 4, 5:
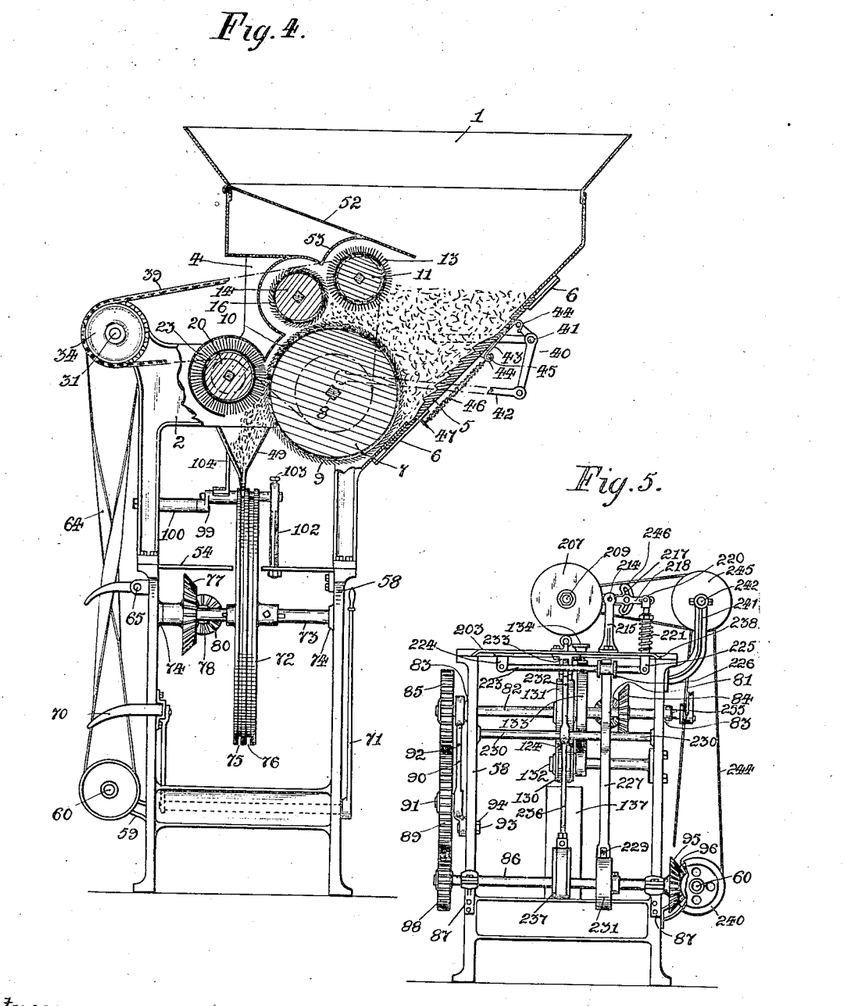
Fig. 4 is an end elevation of the machine showing the feed mechanism in section.
Fig. 5 is an end elevation of the machine at the delivery end.
Figure 6:
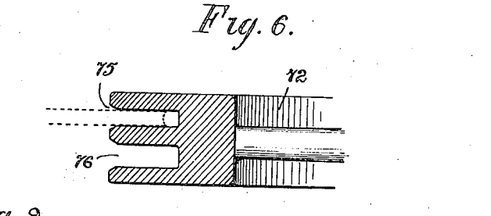
Fig. 6 is an enlarged cross sectional view of the rim of the distributing wheel.
Figure 7:
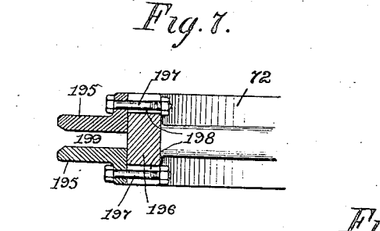
Fig. 7 is an enlarged cross sectional view of the rim of a slightly modified form of distributing wheel.
Figure 8:
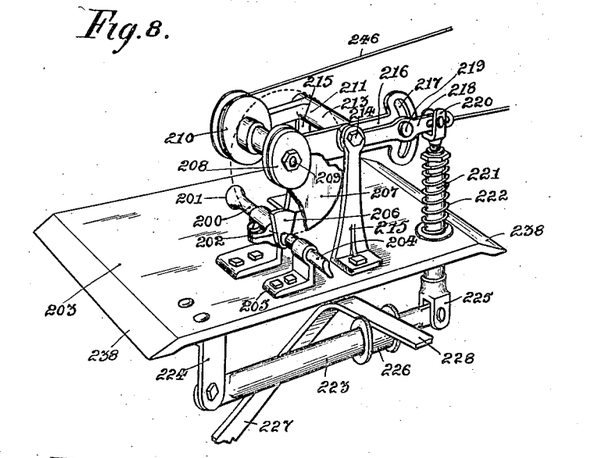
Fig. 8 is an enlarged perspective detail view of the shearing mechanism.
Figures 9, 10, 11:
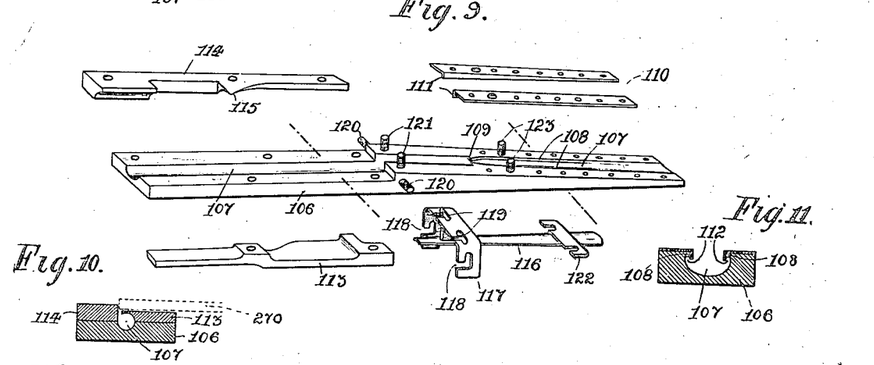
Fig. 9 shows enlarged perspective detail of parts to the forming tube.
Fig. 10 is an enlarged cross sectional view of the forming tube toward the finishing end.
Fig. 11 is a similar view toward the entrance.
Figure 12:
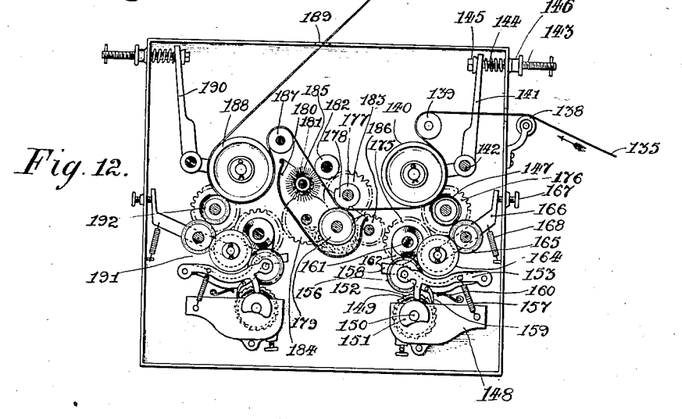
Fig. 12 is an enlarged plan view of the printing mechanism.
Figure 13:
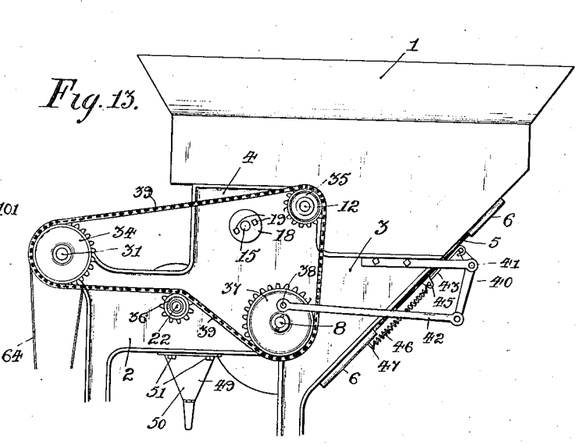
Fig. 13 is an elevation of one side of the hopper showing the means of operatively connecting the rolls.

In Fig. 7, a modification of the carrier wheel is shown, in which the rings 195 are mounted on the rim 196 and adjustably secured to the said rim by the bolts 197 extending through the slots 198 in said rim. The said slots permit the lateral adjustment of said rings 195 on said rim, so as to narrow or widen the groove 199, which corresponds to the grooves 75 or 76.

200 is a tube having the bell mouth 201 and arranged in longitudinal alinement with the delivery end of the groove 107 and adapted to receive the stick of cigarette form projecting beyond the longitudinal base plate 106, the endless ribbon 124 supporting said stick of cigarette for a portion of the distance between said base plate and said tube 200. The tube 200 is supported by the bracket 202 which in turn is bolted to and supported by a sliding shelf 203.

204 is a tube in longitudinal alinement with the tube 200 and supported by the bracket 205 bolted to the shelf 203 in proximity to the bracket 202.

206 is a knife guide secured at the delivery end of the tube 200. The stick of cigarette passes through the tube 200 and into the tube 204.

207 is a rotary knife secured to the hub 208, the latter being fixedly mounted on the shaft 209.

210 is a pulley fixedly mounted at the other end of the shaft 209.

211 is a yoke carrying the bearings 212 for the shaft 209 at the ends thereof and forming a sleeve bearing 213 for the shaft 214 on which it swings. The shaft 214 is supported in the bracket 215 secured to the shelf 203 adjacent to the tubes 200 and 204.

216 is an arm projecting rearwardly from the yoke 211 and having the arc-shaped slot 217 in its enlarged extremity.

218 is an arm at one end encircling the shaft 214 and extending beyond the arm 216 having a bolt hole therethrough registering with the slot 217. 219 is a bolt securing the said arm 218 in any desired position in the slot 217. It will be thus seen that the yoke 211 may be set in any desired position by swinging the said yoke on the shaft 214 and securely fastening the said yoke to the arm 218 in said position by the bolt 219.

220 is a forked upper end threaded and inserted in the rod 221 and embracing the extremity of the arm 218 and pinned to said arm through a suitable hole in the end thereof.

221ª is a spiral spring encircling the rod 221 between the shelf 203 and the stop 222, the latter being in the form of a nut for adjusting the tension of said spring.

223 is a lever pivotally secured to the bracket 224, secured to the under side of the shelf 203, the said lever 223 being pivotally secured at its other end to the fork 225, rigid with the lower end of the rod 220, which projects through the shelf 203.

226 is a roller having outwardly extending flanges at each end thereof and journaled on the lever 223.

227 is a lever having at the top end thereof an angular section 228 extending between the flanges of the roller 226 and at its lower end the roller 229. The lever 227 is pivoted on the rod 230 secured to each side of the frame 58 intermediate of the height thereof.

231 is a cam fixedly mounted on the shaft 86 and contacting in rotation with the roller 229 at the lower end of the lever 227, so that during the major portion of the revolution of said cam, the rod 220 is held to its lower position against the pressure of the spring 221, but during the minor portion of the revolution of said cam, the spring forces the rod 221 to its upper position and brings the rotary knife 207 into cutting position between the tubes 200 and 204.

232 is a bell crank lever pivoted at its angle on the rod 230 and joined to the lug 233, secured to the under side of the shelf 203 by the link 234.

235 is an eccentric fixedly mounted on the shaft 86.

236 is a connecting rod pivotally connecting the other section of the crank lever 232 to the eccentric strap 237. The connecting rod 236 is arranged to be adjustable in regard to the length thereof for changing the travel of the shelf 203, and the section of the crank lever is arranged with a plurality of holes for changing the position of the fastening of the connecting rod 236. The shelf is supported, as may be inferred, from the position of the tubes 200 and 204, at the extreme end of the table 54, the flanges 238 of the shelf 203 sliding in suitable ways on the table over an opening 239 in said table.

240 is a pulley fixedly mounted on the main driving shaft 60.

241 are brackets supporting bearings for the shaft 242, said brackets being rigidly secured to the frame 58 at the upper end thereof and adjacent to the shelf 203.

243 is a pulley operatively connected to the pulley 240, by the belt 244.

245 is a pulley fixedly mounted on the shaft 242 and operatively connected to the pulley 210 by the belt 246.

It will thus be seen that the knife 207 is driven from the main shaft at a much increased speed regulated by the dimensions of the pulleys.

The travel of the shelf 203 through its connection with the eccentric 235 insures a straight cut by the knife as the stick of cigarette form passes through the tubes 200 and 204.

247 is a paste pot cylindrical in form having at one end the angular delivery tube 248 and at the other end a central orifice 249. The paste pot 247 is longitudinally arranged on top of the table to one side of the base plate 106 and toward the delivery end thereof and secured to said table by the strap 250.

251 is a threaded spindle inserted through the orifice 249 and joined to the piston 252 operating within the pot 247.

253 is a ratchet wheel having a central threaded orifice corresponding to the spindle 251 and mounted thereon at the outside of the pot.

254 is a cover secured to the pot to the outside of the ratchet 253, said ratchet operating between said cover and the end of the pot.

255 is a disk secured to an outwardly extending end of the shaft 82 having a pin 256 projecting therefrom to one side of the center.

257 is a bar having an orifice at one end thereof and loosely encircling the spindle 251, the other end of said bar being pivotally secured to the rod 258 connecting the said bar and the pin 256.

259 is a pawl pivotally secured to the bar 257 engaging the ratchet 253, so that at each revolution of the disk 255, the ratchet is turned to a certain extent thereby pushing the piston 252 toward the delivery end of the pot and forcing the paste out through the tube 248.

260 is a crank handle on the extreme outer end of the spindle 251 for adjusting by hand the position of said piston.

261 is a plate adjustably secured to the top of the table 54 adjacent to the delivery paste tube 248 and supporting the bearings 262 and 263. The plate 261 is in the shape of a quadrant and is secured to the table by a bolt extending through arc-shaped slots in the quadrant and table. The bearings 262 and 263 extend from the plate 261 above and below said table and therethrough.

264 and 265 are shafts journaled in said bearings, the shaft 264 carrying the bevel pinion 266 at the lower end thereof and the spur pinion 267 above said bevel wheel and the shaft 265 carrying at its lower end the spur pinion 268 coacting with the spur pinion 267.

269 is a grooved wheel having its lower flange slightly wider than the upper and forming a ledge to receive the paste from the angled tube 245, the said grooved wheel being mounted on the shaft 264 above the table 54. The grooved wheel 269 is adjustable on the shaft 264 as shown by the encircling spring below and nut above.

270 is a disk mounted on the shaft 265 and extending into the groove of the wheel 269, collecting paste from said groove and applying it on the upwardly projecting edge of paper passing through the forming mechanism.

271 is a bevel gear wheel fixedly mounted on the shaft 78 and driving the bevel pinion 266 consequently operating the paste applying mechanism.

In the operation of this machine, the tobacco is fed into the hopper 1 in quantity and the machine set in motion. The operating connection from the main shaft to the rolls in the feed mechanism has already been fully described, as also the operating connection to the shaker 5. The shaker, as explained, moves upward and downward on the inner side of the incline of the hopper and this maintains a constant feed of tobacco to the main feed roll 7. The main feed roll 7 rotating in a direction the same as the incline of the picks projecting from its periphery carries said tobacco by means of said picks around therewith in its rotation. The regulating roll 11 turning in the same direction as the main feed roll thereabove, brushes away the surplus of tobacco likely to be lifted by said main feed roll and also catches the tobacco taken from said main feed roll by the drag roll 14, as said drag roll 14 is the final means of regulating the quantity of tobacco fed into the machine for the making of the cigarettes, and it will be seen that in this drag roll, the picks incline in a rearward direction in relation to the rotation of said roll and act in the way of fingers dragging over the tobacco on the main feed roll, thus closely governing the quantity and not in any way injuring the tobacco fed into the machine. The tobacco carried by the main feed roll beyond said drag roll is swept by the bristle roll 20 from the main feed roll into the funnel 49, from there falling into the groove in the carrier wheel 72. The carrier wheel 72 revolving in the direction toward the forming mechanism carries the tobacco on to the bridge piece and so on to the base plate 106 in the longitudinal groove 107. The paper, which extends from the printing mechanism on to the endless ribbon 124, receives the rope of tobacco delivered from the carrier wheel and carries said rope of tobacco along the groove 107. The rope of tobacco continues along the groove 107 under the strip 116 and is firmly pressed by said strip. As the tobacco on the paper continues in its onward course, one edge of said paper is turned over on top of the tobacco by the top piece 114, while the other edge of the paper projects upwardly between the top pieces 113 and 114, and it is at this point in the travel of said tobacco on the paper that the pasting mechanism comes into operation, that is to say, the disk 270 contacts with the paper in passage and the said paste covered edge is then turned over by the lateral projection 115 on the top piece 113. The stick of cigarette is then complete, only requiring to be cut into lengths in order to produce the finished article. The stick of cigarette continues toward the bell mouth 201 of the tube 200 and on to the tube 204, in the meantime, the knife is released by the mechanism as described and falls into cutting position between the tubes 200 and 204, the travel of the shelf 203 being so arranged as to insure perfect cutting of the stick of cigarette formation, that is to say, the cutting is accomplished during the coincident travel of the shelf and the stick of cigarette.

Figure 16:
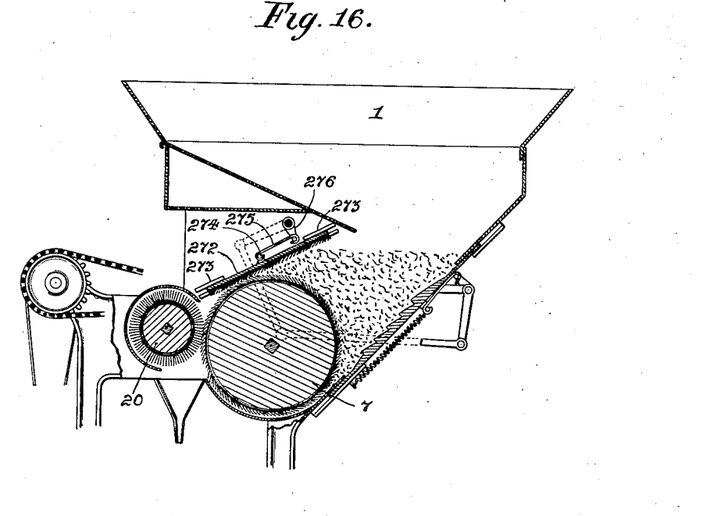
Fig. 16 is a vertical sectional view of the hopper and a cross sectional view of the feed rolls therein contained and another form of device for regulating the quantity of tobacco feed.
Figure 17:
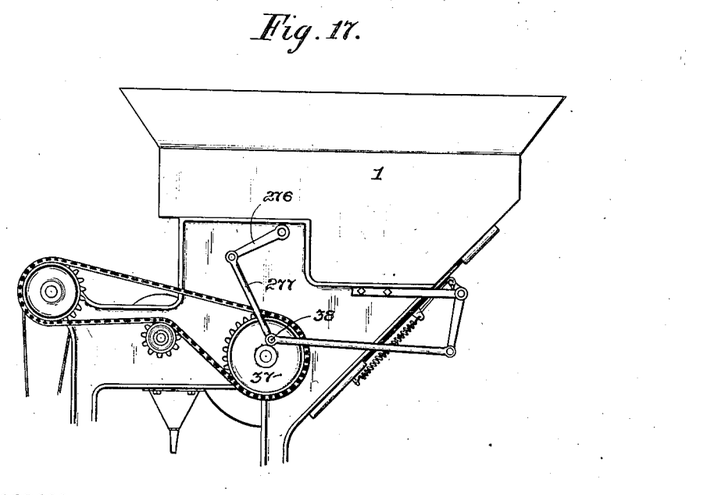
Fig. 17 is a side elevation of the hopper showing the operating connection of the parts illustrated in Fig. 16.

In Figs. 16 and 17 another form of drag regulating device is shown, which is substantially the same as the drag roll, and in the said figures, 272 is a plate having picks projecting therefrom in a rearward direction from the forward direction of travel of said plate. 273 are slide ways in the sides of the vertical extensions 4 arranged in an oblique direction in the hopper 1 above the main feed roll 7, said drag plate 272 sliding in said slide ways. 274 is a pin projecting from the back of the plate 272. 275 is a link pivotally secured to the pin 274. 276 is a crank pivotally secured to the other end of the link 275 having a section thereof extending through a vertical extension and another section thereof pivotally secured to the connecting rod 277, the connecting rod 277 being pivotally secured at its other end to the pin 38, consequently a reciprocal movement will be imparted to the drag plate 272 on the rotation of the sprocket wheel 37 and in this form of feeding mechanism the supplementary regulating wheel will not be necessary. In this arrangement of regulation, the incline picks from the drag plate 272 represent fingers dragging over the tobacco carried upwardly and around by the main feed roll 7, thus closely governing the quantity of tobacco carried around to the bristle roll 20.

The salient features in regard to the feed members in the hopper are the drag means for regulating the quantity of tobacco fed to the funnel immediately therebelow and the construction and arrangement of the main feed roll in relation to the said drag means, in addition the means employed for keeping the tobacco shaken down to the main feed roll is important and it will be readily understood that many modifications in regard to these parts may be made without departing from the spirit of the invention, further, there may be many changes in the actual construction from the machine as now made in the various parts without affecting the simplicity of their form and arrangement, and while that particular form and arrangement have been described in detail herein, in order to give a better understanding of the operation of the machine, it will not necessarily be adhered to, and broadly the invention is a combination of simple parts arranged in simple form resulting in the avoidance of complication and consequent expense in construction and maintenance.

In the arrangement of gears 85, 88 and 89, it will be seen that the speed of the complete feeding and forming mechanism is affected, thus regulating the length of the cigarette to be made.

Several different sizes of gear wheels may be used on the shaft 86 in the place indicated by the gear wheel 88, according to the length of the cigarette desired but in this connection it may be said that the speed of the rotary knife remains the same as it is driven from the main shaft.

Figure 15:
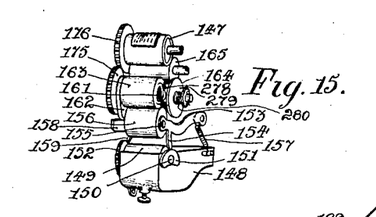
Fig. 15 is a perspective detail of ink rolls in the printing mechanism.

In the detail view, Fig. 15, a means of distributing the ink on the application roll is shown, this arrangement being adopted to lessen the number of inking rolls required and it will be seen that the roll 163 is shown with one end in the form of a cam face 278 engaging the flange 279 at that end of the roll 164. The roll 164 is slidably arranged on its bearing and spring-held by the spring 280 to the inner end, that is to say, the flange spring is held against the cam face 278.

This is a very simple arrangement of distributing the ink and as before stated serves the purpose, without increasing the number of rolls and is particularly applicable to cigarette machines.

One feature of the funnel 49 has not been emphasized, that is the lower arrangement of the sides, particularly shown in the hinged flaps 281 and 282, the rear hinged flap 282 extends to the bottom of the groove in the carrier wheel 72, so that it acts as a scraper in any tobacco carried around and not removed by the bridge piece leading to the forming mechanism, while the front hinged flap 281 permits the inspection of the funnel, the same as can be done from the rear by the hinged flap 282, though the latter has a double function, of an inspection lid and scraper.

What I claim as my invention is:

1. In a cigarette making machine, a main hopper, a rotating feed member suitably journaled and within said hopper and having means projecting from the periphery thereof for grasping tobacco, a rotating member journaled adjacent to the aforesaid member and having means projecting from its periphery for engaging and leveling the tobacco on said feed member, a rotating member journaled adjacent to the aforesaid members and having means projecting from the periphery thereof for clearing away the surplus tobacco from said members, a rotary brush journaled adjacent to said main rotating member and in rotation sweeping the tobacco therefrom, a supplementary hopper, a channel member receiving said tobacco from said supplementary hopper, and means for forming the cigarette.

2. In a cigarette making machine, the combination with the hopper, of a main feed roll, having picks projecting from the periphery thereof in the direction of rotation, and journaled within said hopper, a roll journaled adjacent to said main feed roll having picks projecting from the periphery thereof inclined rearwardly from the direction of rotation and effecting a drag on the tobacco of said main feed roll, a supplementary roll having radially projecting picks therefrom and engaging the surplus tobacco to the front of said drag roll and driving it back to the feed passage in the hopper, a channeled member receiving the tobacco from the main feed roller, and means for transporting said tobacco from said channeled member and forming the same into the cigarette.

3. In a cigarette making machine, the combination with the hopper, of a main feed roll suitably journaled within said hopper and having picks projecting from the periphery thereof inclined in the direction of rotation of said roll, a roll journaled adjacent to said main feed roll having picks projecting from the periphery thereof inclined rearwardly from the direction of rotation of said roll and engaging the tobacco on said main feed roll, a roll suitably journaled in said hopper in advance of said drag roll and having picks extending radially therefrom and engaging the tobacco and sweeping the surplus quantity back to the feed passage of the hopper, means for agitating the tobacco in said feed passage, a channeled member receiving the tobacco from said feed roll, and means for transporting the tobacco from said channeled member and forming said tobacco into the cigarette.

4. In a cigarette making machine, the combination with the hopper, of a plurality of rolls suitably journaled and rotating within said hopper, a toothed shaker plate slidably arranged on the inclined side of said hopper and engaging tobacco therewithin having a pivotally held link secured thereto and a spring extending from said link and secured to the hopper side, a crank lever pivotally supported from said hopper side and pivotally secured to the other end of said link, a connecting rod at one end pivotally secured to the other section of said crank lever, a disk rotated with one of said rolls and having a pin from the side face thereof secured to the other end of said connecting rod, a channeled member receiving the tobacco from said feed roll, and means for transporting the tobacco from said channeled member and forming said tobacco into the cigarette.

5. In a cigarette making machine, the combination with the hopper, of a main feed roll having shaft extensions therefrom projecting through the sides of said hopper, sprocket wheels mounted on said shaft extensions, a drag roller journaled adjacent to said main feed roll, having shaft extensions therefrom extending through the sides of said hopper, a sprocket wheel mounted on the drag roll shaft, a sprocket chain connecting said main and drag rolls, a bristle roll journaled in the sides of said hopper and having a shaft extension therefrom, a sprocket wheel mounted on a shaft extension from said bristle roll, a driven shaft suitably journaled, a sprocket wheel suitably mounted on said driven shaft, a sprocket chain around said sprocket wheel on the driven shaft and extending over the sprocket wheel on the bristle roll shaft and around the sprocket wheels on said main and supplementary roll shafts, a worm formed on said driving shaft, a shaft journaled in bearings set at right angles to the bearings for said driving shaft, a worm wheel coacting with said worm, a pinion mounted on the latter shaft, a gear mounted on the shaft extension from said main feed roll coacting with said pinion, a channeled member receiving the tobacco from said feed roll, and means for transporting the tobacco from said channeled member and forming said tobacco into the cigarette.

6. In a cigarette making machine, the combination with the hopper and feed members therein contained, of a carrier wheel suitably journaled and supported beneath said feed members and having a plurality of circumferential grooves of different widths, said wheel being laterally adjustable, a funnel extending into one of said grooves from said feed members, means for driving said carrier wheel and said feed members, a forming tube, and means for transporting tobacco through said tube and forming the cigarette.

7. In a cigarette making machine, a frame and table supported by said frame having a wheel slot therethrough toward one end thereof, bearings supported by said frame to each side of said slot, a shaft journaled in said bearings, a carrier wheel mounted on said shaft and laterally adjustable thereon and having a plurality of circumferential grooves in the rim thereof, means for driving said wheel, means for feeding the tobacco into said wheel and means for forming the cigarette from the tobacco received from said wheel.

8. In a cigarette making machine, a frame, a table supported by said frame, having a slot therethrough toward one end thereof, bearings supported by said frame to each side of said slot, a shaft journaled in said bearings, a wheel mounted on said shaft extending upwardly through said slot and having a circumferentially grooved rim, a bevel gear wheel mounted on said shaft, a longitudinal shaft journaled in suitable bearings from said frame, a bevel gear wheel coacting with the aforesaid gear wheel, a bevel gear mounted at the other end of said longitudinal shaft, a lateral shaft journaled in suitable bearings in said frame, a bevel gear wheel mounted thereon and driving said longitudinal shaft, a spur gear wheel mounted at the end of said lateral shaft, a lower lateral shaft journaled in suitable bearings in said frame, a spur gear wheel mounted at one end thereof, a bearing swinging from the upper lateral shaft and adjustably secured to the frame, a spur gear wheel journaled in said bearing, a bevel gear wheel mounted at the other end of said lower lateral shaft, a main driving shaft, a bevel gear wheel coacting with the bevel gear wheel on said lower lateral shaft, and means for driving said main shaft.

9. In a cigarette making machine, a frame and table supported on said frame, a slot therethrough toward one end thereof, a frame supported above said slot, feed members supported by said frame, bearings supported by the main frame, a carrier wheel having a grooved rim journaled in said bearings, an arm having an angular projection extending through a slot in the said upper frame and suitably secured in said slot, a shaft secured to the end of said arm at one end and at the other end adjustably supported by a post from said table, a pressure wheel journaled on said shaft and extending into a groove on said carrier wheel, a scraper finger rigidly supported on said shaft and extending partially around said pressure wheel, means for driving said carrier wheel, and means for wrapping the tobacco received therefrom into cigarette form.

10. In a cigarette making machine, a frame and a table supported thereby, a forming tube having a longitudinal central groove in the base thereof and a gradually rising entrance end terminating intermediate of the length of the base in vertical shoulders on each side of said groove, a pair of longitudinal plates mounted on said rising end and converging inwardly over the said central groove at their inner ends and a pair of plates mounted and secured on the other end of the base one on each side of the groove and at their inner ends meeting the said vertical shoulders, the latter plates having inwardly extending formers over said groove, and means for delivering tobacco to said tube.

11. In a cigarette making machine, a frame, a table supported by said frame, a forming tube having a base plate and a longitudinal central groove therethrough open at one end and closed at the other, said open end being wide and flat for a portion of its length and having overhanging ledges and strip covers to each side extending down below said ledges and forming a recess at each side into which the wrapper projects in passage through the tube, threaded posts projecting upwardly and laterally from said base plate in pairs, a bracket having L and T shaped slots mounted on two pairs of said screws, a strip secured to said bracket and extending forwardly along the entrance end of said groove, a cross strip having slots inserted over the other pair of said screw posts, nuts securing said bracket and said strip securely in position, means for feeding the wrapper to and through said tube, and means for feeding the tobacco into said tube.

12. In a cigarette making machine, a frame, a table supported by said frame, a forming tube having a slit therethrough intermediate of its length above one edge, of a longitudinal central groove through which the wrapper in passage projects, a cylindrical paste pot supported on said table having the delivery tube projecting from one end thereof and a piston operating therewithin and a threaded spindle secured to said piston, a ratchet having a centrally threaded orifice therethrough and mounted on said threaded spindle to the outside of said paste pot, a cover to the outside of said ratchet and secured to said paste pot, a lever at one end loosely mounted on said spindle and the other end pivotally secured to a connecting rod, a pawl pivotally secured to said lever and engaging said ratchet, a rotating disk supported by said frame secured to said connecting rod, a plurality of vertical bearings supported in said table, a plurality of vertical shafts journaled in said bearings operatively connected beneath said table, a grooved wheel mounted on one of said shafts and a disk on another of said shafts extending into said grooved wheel and meeting the aforesaid wrapper in passage, means for rotating one of said vertical shafts, means for feeding the wrapper to and through said tube, and means for feeding the tobacco into said tube.

13. In a cigarette making machine, a frame, a table supported thereby having an opening at one end thereof, separated tubes in longitudinal alinement supported on a shelf, said shelf slidably arranged over said opening, a bracket rigidly secured to said shelf and a bearing laterally extending from said bracket, a yoke journaled on said bearing and supporting suitable bearings at the outer ends thereof, a shaft journaled in said outer bearings, a rotary knife fixedly mounted on said shaft at one end, a pulley fixedly mounted on said shaft at the other end, an arm extending rearwardly from said yoke and rigid therewith, spring means for holding said arm in its upward position and intermittent means for depressing said arm and moving said knife away from its cutting position, means for propelling the stick of cigarette formation to said tubes, and means for driving the aforesaid pulley and shearing mechanism.

14. In a cigarette making machine, a frame, a table supported thereby having an opening at one end thereof, a shelf slidably arranged over said opening, separated tubes in longitudinal alinement supported on said shelf, a bracket rigidly secured to said shelf and supporting a bearing, a yoke journaled on said bearing and forming bearings at the outer ends thereof, a shaft journaled in said yoke bearings, a rotary knife rigidly mounted on said shaft at one end, a pulley fixedly mounted on the other end, an arm extending rearwardly from said yoke having an arc-shaped slot in its enlarged end, a supplementary arm at one end loosely mounted on the same bearing as the yoke and set in a suitable position in said arc-shaped slot and fixedly held in such position and having an extending end, a vertical rod secured to said supplementary arm at the extremity thereof extending downwardly through the shelf, an adjustable spring encircling said vertical rod above said table and holding said rod in its upper position, a horizontal lever pivotally supported from and beneath said shelf at one end and pivotally secured to said vertical rod at the other, a roller sleeve on said horizontal lever, a lever having an angle end operating on said roller sleeve and pivotally supported intermediate of its length, a rotating cam supported by the frame of the machine and engaging the lower end of the latter lever, means for sliding said shelf during cutting operations, means for forming a stick of cigarette and feeding the same to said separated tubes, and means for driving said rotary knife.

15. In a cigarette making machine, a frame, a table supported thereby having an opening at one end thereof, a shelf slidably supported over said opening, means for cutting the stick of cigarette formation supported on said shelf, a crank lever pivotally secured in said frame, a link pivotally joining said table and one section of said crank lever, a driving shaft journaled in said frame, an eccentric mounted on said shaft having a suitable strap, an adjustable connecting rod pivotally joining the other section of said crank lever and said eccentric strap, and means for delivering the stick of cigarette formation to said cutting means coincidently with the operation of said shelf sliding mechanism.

16. In a cigarette making machine, a frame, a table supported by said frame, a frame standing on said table having vertical extensions therefrom, a plurality of bearings in said vertical extensions, a plurality of rolls journaled in said bearings in said vertical extensions, a hopper supported on said upper frame having a shield plate extending inwardly and roofing said rolls and a shield plate from the aforesaid shield plate formed around and to the rear of the said rolls, an adjustable funnel extending from the lower end of said rear shield plate, a rotating guide extending to said funnel, and means for forming a cigarette connected with said rotating guide.

17. In a cigarette making machine, the combination with the table, frame support, forming tube and suitable feed members, of an endless ribbon extending from end to end along and through said forming tube, a roller journaled in suitable brackets secured to the top of said table beyond the delivery end of said forming tube, over which said ribbon extends, a roller journaled in suitable brackets on the top of the table at the entrance end of said forming tube and over which said ribbon extends, a roller journaled in the bracket projecting upwardly from the table intermediate of the length of said tube and over which said ribbon extends, a driving shaft journaled in said frame adjacent to the upper end thereof, a drum fixedly mounted on said shaft and a roller adjustably supported beneath said drum and contacting therewith, said ribbon extending around said drum and roller and therebetween and operated through said forming tube by the rotation of said drum.

18. In a cigarette making machine, the combination with the table, frame support, forming tube and suitable feed members, of an endless ribbon extending through said forming tube, rollers journaled in suitable brackets projecting upwardly from the table at each end of said tube and over which said ribbon extends and a roller journaled intermediate of the length of said table over which said ribbon extends, a driving shaft journaled in said bearings in said frame, a drum mounted on said shaft and over which said ribbon extends, a shaft projecting inwardly from the frame and adjustably secured thereto, a roller journaled at the inner end of said shaft and around which said ribbon extends, said roller pinching said ribbon to said drum, a spring support secured to the end of said shaft, and an adjusting screw extending through an orifice in said table into a correspondingly threaded hole in said spring support.

19. In a cigarette making machine, the combination with the table, frame support, forming tube and suitable feed members, of an endless ribbon extending through said forming tube, a roller suitably journaled at the beginning of said tube and over which said ribbon extends, a roller journaled beyond the delivery end of said tube and adjustable in its bearings and supporting said ribbon on a level with said tube, a driving shaft, a drum on said shaft over which said ribbon extends, a shaft extending inwardly from the frame and adjustably secured to said frame, a roller journaled at the end of said shaft and pinching said ribbon to said drum, said ribbon extending around said roller and carrying a length of paper into said tube, a flat spring formed in a suitable curve around said driving shaft and flexibly supporting the end of said roller shaft, an adjusting screw extending through a suitable hole in the table into a correspondingly threaded hole in the upper turned end of said spring, tubes receiving said cigarette and arranged on a level with said extending ribbon above the table and means for shearing the cigarettes.

20. In a cigarette making machine, a casing having paper entrance and exit openings, a guide roller secured at said entrance opening, a plurality of adjustably journaled rolls around which said paper extends, a type roller, an ink or size well, a roller journaled in said well, a cam and a sprocket wheel mounted on the well roller shaft, a lever spring-pulled to its lower position having a finger engaging said cam, a gelatin roller journaled at the end of said lever, a pivoted lever spring-held to its upward position, a pawl pivoted on said lever and engaging said sprocket wheel, an intermediate gelatin roller engaging the aforesaid gelatin roller subsequent to the rubbing of the latter with the well roller, a cam on the shaft of the intermediate roller engaging said pawl shaft at each revolution, adjustable bearing secured to the side of said casing, an ink or size application roller meeting said type roller and journaled in said adjustable bearings, a second intermediate roll journaled in said adjustable bearings and supplying the ink to the application roller and a plurality of rollers suitably journaled in said casing around which the said paper extends to the exit opening, and means for guiding said paper upwardly, a forming tube, an endless ribbon traveling in said forming tube on to which said paper is guided.

21. In a cigarette making machine, a casing having paper entrance and exit openings, a crank lever pivotally secured in said casing and having a journal bearing at the end of its lower section, a threaded rod extending through a correspondingly threaded orifice in said casing and engaging the extremity of the other section of said crank lever, a spiral spring encircling said rod between said upper section and said casing, a roller journaled at the end of the lower section of the crank lever, a roller journaled in the side of said casing above said roller, said paper extending inwardly over the upper roller and around the crank lever roller, a type roller engaging said paper on said crank lever rollers, a plurality of gelatin rolls suitably arranged, a well, and pivoted levers operating said roll in the wells, gear wheels mounted on roller shafts and operatively connecting the same within the casing, a pinion arranged outside the casing connected with a roll shaft, a main driving shaft connected with said pinion, rollers guiding said paper out of said casing, and forming tubes receiving said paper.

22. In a cigarette making machine, the combination with the main frame, a table, and a hopper frame standing on said table, of a main driving shaft journaled in suitable bearings from said frame, a tapered pulley mounted on said driving shaft, a shaft journaled in suitable bearings from said hopper frame above said main shaft, a tapered pulley on said secondary shaft set in the opposite direction to the aforesaid tapered pulley, a shaft journaled in bearings arranged at right angles to the bearings of said secondary shaft, a worm and gear mechanism connecting said upper shafts, a cross belt connecting said tapered pulley and a belt shifter engaging said cross belt and having a rod threaded and sliding in lugs from the main frame, and a nut on said threaded end, and feed members operated by said worm and gear connection.

23. In a cigarette making machine, the combination with the main frame, a table, and a hopper frame standing on said table, of a main driving shaft journaled in suitable bearings in said main frame, a tapered pulley on said main shaft, a secondary shaft journaled in the bearings from said hopper frame and having a worm formed at the end thereof, a tapered pulley on said secondary shaft, a worm wheel shaft journaled in bearings at right angles to said secondary shaft, a main feed roll journaled in said hopper frame, a gear wheel mounted on the shaft of said main feed roll, a pinion mounted on said worm wheel shaft, a worm wheel meshing with said worm, a drag roll, a sprocket and chain connection from said main roll to said drag roll, a supplementary regulating roll, a bristle roll adapted to clear said main roll, a sprocket and chain mechanism connecting said secondary shaft with said supplementary and bristle rolls, a belt connecting said tapered pulleys, and a belt shifter engaging said belt intermediate of the length thereof.

24. In a cigarette making machine, a frame, a table supported by said frame, feed members and a forming mechanism, a sliding shelf supported on said table at the end of said forming mechanism, brackets supporting bearings and extending from said frame upwardly above said shelf, a shaft mounted on said bearings, a plurality of pulleys mounted on said shaft, a main driving shaft, a pulley mounted thereon and connected to one of the aforesaid pulleys, a bracket extending upwardly from said sliding shelf supporting a bearing, a yoke swinging on said bearing and forming bearings at the outer end thereof, a shaft journaled in said bearings formed on a yoke, a knife mounted on the latter shaft at one end and a pulley mounted at the other, a belt connecting said knife shaft pulley to one of the aforesaid pulleys above said table, and a belt connecting the other of said pulleys above said table to the pulley on the main shaft.

25. In a device of the class described, the combination with the paste pot having a delivery tube extending therefrom and means for promoting the flow of paste through said tube, of a pair of vertical shafts journaled in suitable bearings adjacent to said delivery tube, a grooved wheel fixedly mounted on one of said vertical shafts and having its lower flange extending beyond its upper flange and forming a ledge for the reception of the paste, an application disk mounted on the other of said shafts and extending into the groove in said wheel, means for rotating said shafts, and means for forming the stick of cigarette and propelling it past said application disk.

26. In a device of the class described, the combination with the paste pot having a delivery tube and means for promoting the flow of paste through said delivery tube, a pair of vertical shafts, adjustable bearings supporting said shafts, a grooved wheel on one of said shafts into which said delivery tube extends, said grooved wheel being vertically adjustable on its shaft, a disk mounted on the other shaft and extending into said groove and vertically adjustable, and a forming tube adjacent to said disk having a slit through which the paper projects in passage.

27. In a device of the class described, a carrier wheel having a plurality of circumferential parallel grooves of different widths in the rim thereof, a frame, a shaft suitably journaled in said frame and supporting said wheel, said shaft being laterally adjustable in relation to said frame, means for forming the tobacco received from said wheel into cigarettes, and means for feeding the tobacco to said wheel.

28. In a cigarette making machine, the combination with the hopper and a rotating tobacco transporting member journaled in said hopper and having picks projecting from the outer surface thereof in the direction of rotation, of a toothed reciprocating plate slidably arranged in said hopper and operating in conjunction with said transporting member.

Signed at the city and district of Montreal, in the Province of Quebec, in the Dominion of Canada, this fifth day of September, 1908.

CANAAN de CAZEN.

Witnesses:
  H. DAVIS,
  G. H. TRESIDDER.